March 21, 1961  H. G. ABBEY  2,975,882
MECHANISMS FOR INDIVIDUAL CARRIER SELECTION OF
PROCESSING CYCLE IN CONVEYOR SYSTEMS
Filed Nov. 5, 1957  5 Sheets-Sheet 1

INVENTOR.
HAROLD G. ABBEY
BY
ATTORNEYS

TOGGLE LEVER
TL

X POSITION

Y POSITION

OPERATING LEVER
OL

Y POSITION

DISENGAGING LEVER
DL

X POSITION

INVENTOR.
HAROLD G. ABBEY
BY
Kenyon & Kenyon
ATTORNEYS

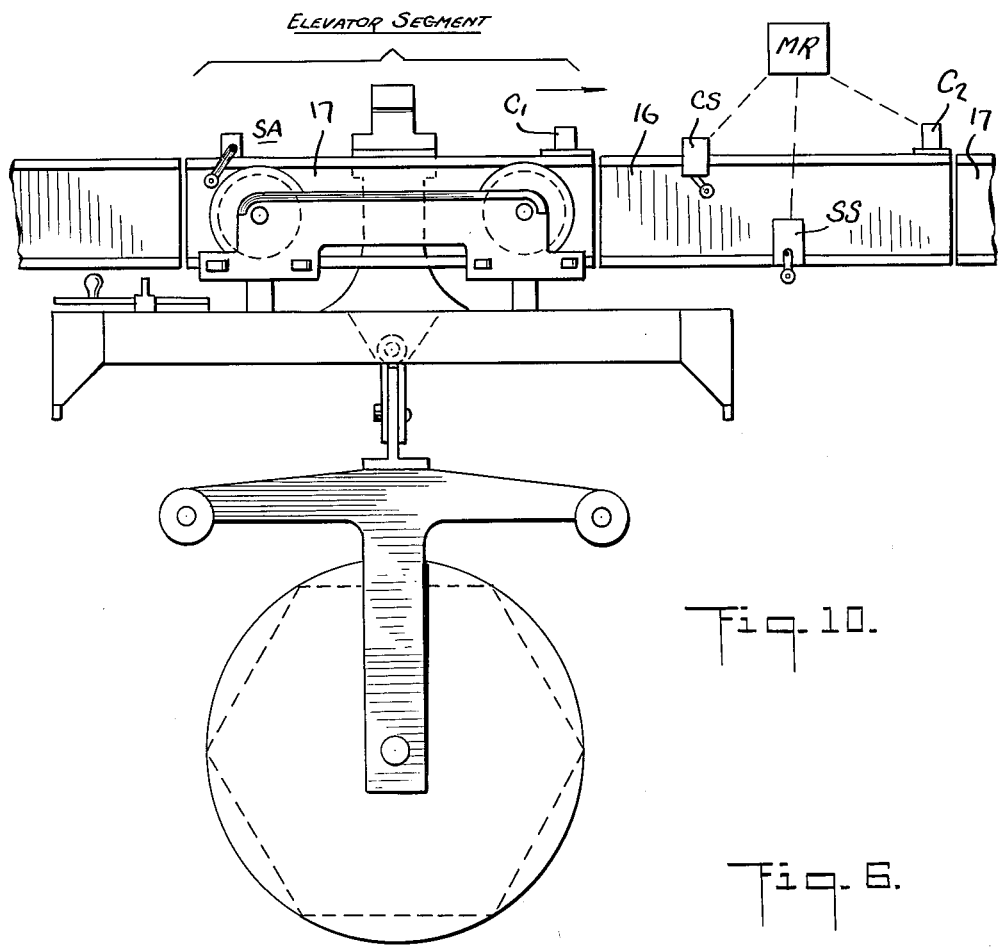
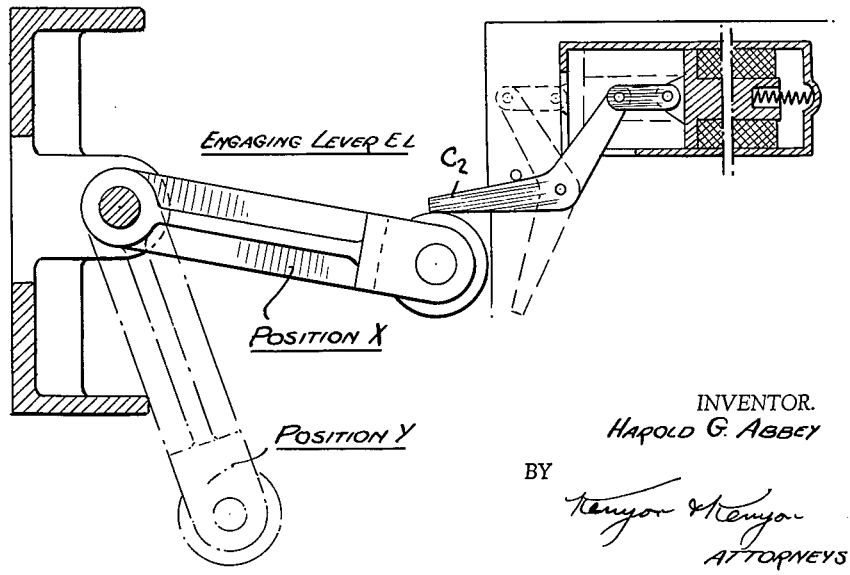

March 21, 1961　　　H. G. ABBEY　　　2,975,882
MECHANISMS FOR INDIVIDUAL CARRIER SELECTION OF
PROCESSING CYCLE IN CONVEYOR SYSTEMS
Filed Nov. 5, 1957　　　　　　　　　　　5 Sheets-Sheet 5

INVENTOR.
HAROLD G. ABBEY
BY
ATTORNEYS 2,975,882

MECHANISMS FOR INDIVIDUAL CARRIER SELECTION OF PROCESSING CYCLE IN CONVEYOR SYSTEMS

Harold G. Abbey, 189—10 Aberdeen Road, Jamaica 23, N.Y.

Filed Nov. 5, 1957, Ser. No. 694,626

8 Claims. (Cl. 198—19)

The present invention relates generally to automatic conveyor systems of the type in which work carriers are conveyed on a track to a series of work stations and more particularly to a tripper mechanism borne by the carrier and adapted to select a predetermined processing cycle therefor.

In my copending application entitled "Skip Transfer Conveyers," filed August 1, 1956, Serial No. 601,461, now issued as Patent No. 2,854,159, there is disclosed a conveyor structure including a plurality of work carriers movable on an overhead track for travel to various work stations therebelow, the track including removable rail segments vertically aligned with said stations. Individual elevators are provided for the removable segments, the work carrier being supported on the rail segment as it is lowered to a work station. For each removable segment there is also provided a substitute segment which automatically replaces the removable segment when it is lowered and serves to re-establish the continuity of the track, thereby permitting uninterrupted passage of the carriers.

The removable and substitute segments are so arranged that the lowering action of the former to a point below the track concurrently causes the admittance of the substitute segment into its track position. Thus no gaps are permitted to remain in the track and the flow of traffic thereon is maintained. This makes possible a leap frog operation in which as one work carrier occupies a down or work position, the next carrier bypasses the occupied station to continue its travel on the conveyor to an assigned station.

The load-carrying trolleys or carriers run on an I-beam track in a conventional manner and are driven by power pushers which are not permanently connected to the carriers, hence the carriers can be switched at will from a power conveyor line onto free lines. Such power and free conveyors have many advantages in manufacturing operations over arrangements in which the power means are permanently coupled to the carriers, for the carriers need not be unloaded from start to finish of the operation.

To facilitate automatic operations at high speed with a conveyor system as above described, individual and selective control of each carrier is necessary, such that when a carrier enters a processing station, the elevator therein is either actuated to lower the carrier for processsing, or it is unactuated to permit the carrier to bypass or skip the station, depending on the cycle requirements of the system.

Accordingly, it is the principal object of this invention to provide in a power and free conveyor system a mechanism adapted to effect individual carrier selection of the processing cycle. Thus, in selecting its own cycle, the carrier is able to actuate the desired horizontal switch for track system selection, and then to actuate the desired elevators in the system so as to move downwardly for processing or to maintain the elevators in the up position, thereby causing the carrier to pass over the unwanted station.

Also an object of the invention is to provide means whereby an operator is able to make a selection for the carrier's cycle by setting a mechanical device on the carrier in a predetermined position for a given cycle, whereby the carrier proceeds through the selected cycle as the conveyor operates.

In cell processing, where more than one processing station is used to maintain a desired rate of production, the carrier must be able to enter only one cell of a series of identical cells in a processing station and to bypass the others in any order. For example, in a three-cell plating arrangement, the carrier must be able to enter the first and thereafter skip the second or third, or in the alternative, skip the first, enter the second and skip the third, or as a final choice, skip the first and second and enter the third.

Accordingly it is another object of this invention to provide a selector mechanism for the carrier which is adapted to carry out cell processing operations in any of the sequences described above.

Briefly stated, in a conveyor system in accordance with the invention, a tripper mechanism is mounted on each work carrier and is borne thereby, the tripper mechanism coacting with cams and other operative elements arranged on the track in the path of travel. The tripper is adapted to engage an actuating arm for the elevator switch such that when the carrier enters a segment in the conveyor track, the elevator is caused to lower the segment and the work carrier thereon to the processing station.

The tripper mechanism includes an operating lever, an engaging lever and a disengaging lever, which levers have two operative positions X and Y, a switch-over in position being effected by tripping either the engaging or disengaging lever. The operating lever, the engaging lever and the disengaging lever are distinctly positioned to effect engagement respectively with the elevator actuator arm, a fixed cam positioned on the conveyor track between elevator stations and a retractable control cam positioned on the track in advance of each elevator station.

In position X, the operating lever is retracted, the engaging lever is outstretched and the disengaging lever is retracted; whereas in position Y, the operating lever is outstretched, the engaging lever is retracted and the disengaging lever is outstretched.

The levers will engage their related track elements only when outstretched, hence when a carrier enters an elevator station and the tripper mechanism is in position Y, the outstretched operating lever will engage the actuator arm of the elevator switch to cause the elevator to operate. When the same carrier whose tripper is still at position Y thereafter leaves the station, the outstretched disengaging lever makes contact with the fixed cam on the track between stations, thereby switching over the tripper mechanism to position X.

The retractable control cam which lies in the path of the carrier in advance of the next station is contacted by the outstretched engaging lever in position X to switch over the tripper mechanism to position Y, in which event the carrier when entering the next station will actuate the elevator switch. But should the control cam be retracted, then the tripper will remain in position X, the operating lever will be retracted and the next elevator station will be bypassed. Thus by adjustment of the control cam, the operating cycle of the work carrier may be selectively controlled.

For a better understanding of the invention, as well as other objects and further features thereof, reference is had to the following detailed description of the invention to be read in connection with the accompanying drawings wherein like components in the several views are identified by like reference numerals.

In the drawings:

Fig. 6 is a sectional view taken along lines 6—6 in Fig. 3 showing the details of the engaging lever of the tripper mechanism.

Fig. 10 is a longitudinal view of the track showing the position of the various cams thereon.

The conveyor structure

Figure 1:
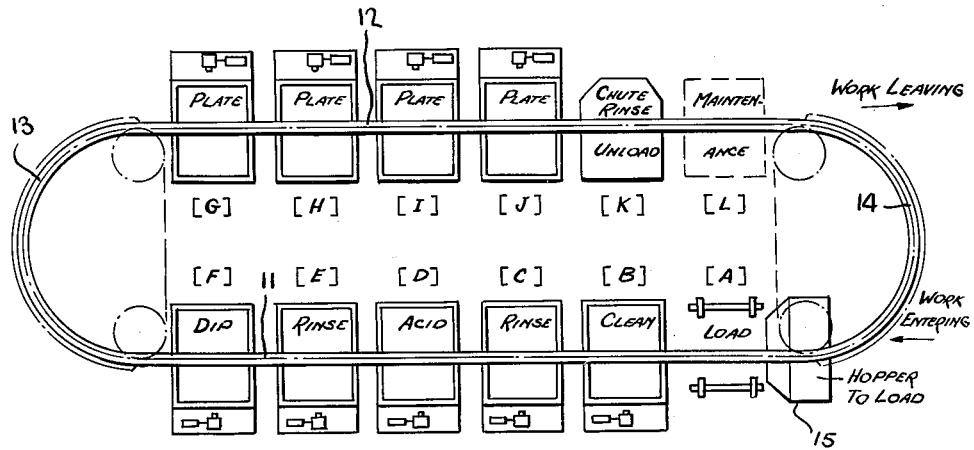
Fig. 1 is a schematic view of an automatic plating machine.
Figure 2:
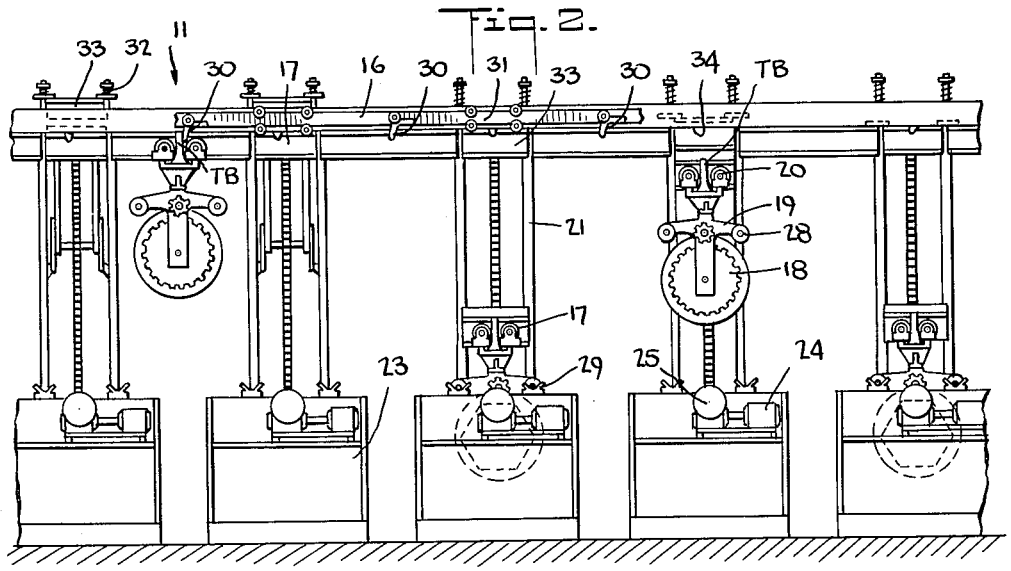
Fig. 2 is an elevational view of the automatic plating machine including a power and free conveyor system incorporating a tripper control mechanism in accordance with the invention.

Referring now to Figs. 1 and 2, there is shown the general arrangement and operation of a continuous line plating machine embodying a conveyor 10, the conveyor being constituted by two parallel straight line track sections 11 and 12 whose ends are effectively linked by arcuate track sections 13 and 14. At spaced locations below track section 11 are six work stations A to F, while below the opposing track section 12 are work stations G to H. The invention, while illustrated with a track loop, is also applicable to straight line operation or any other track layout including test, storage and repair lines. It is also to be understood that the invention is not limited to plating operations and may be utilized to carry out any series of work functions.

Work pieces entering the machine are supplied to a loading chute or hopper 15 whose contents are then dumped into the work cylinders or barrels at the loading station A. From station A, the carriers are transferred to work station B where the articles are chemically cleaned or electro-cleaned as desired. Cold water rinsing is carried out at station C. For this purpose a plain steel tank with a dam overflow may be used. At station D, the articles are subjected to pickling in a suitable acid bath, the tank therefor being lined with an acid-resistant material. After pickling, the articles are cold water rinsed at work station E and here too the tanks must be lined with acid-resistant material, such as lead. Cyanide or acid dip is effected at station F.

Stations G, H and I are reserved for plating operation and for this purpose separate or a single multi-segmented tank may be used. Obviously, any desired number of stations may be employed for this purpose. At station J the plated work is cold water rinsed from which point it is transferred to station K where it is hot water rinsed in a chute and unloaded. Station L may be used for maintenance operation on the conveyor or it may be constituted by a dryer for the plated articles.

Thus, in travelling from stations A to L, a complete plating cycle is effected. By means of the conveyor, the various processing steps are carried out automatically and with maximum dispatch. The plating operations, per se are conventional and form no part of the invention. They do serve, however, to illustrate the functioning of the conveyor, and the manner in which skip transfer or leap-frogging is executed within the context of a plating machine.

As shown in Fig. 2, the overhead track 11 is constituted by a fixedly supported I-beam 16 acting as a monorail and including transfer rail segments 17 which normally are in linear registration with the trackway but are removable therefrom. The rail segments 17, as shown in Fig. 2, are in vertical alignment with the work stations therebelow. The rail may be in various forms, depending on the type of carrier employed. Thus the rail may be constituted of hollow tubing, an inverted T section, a round bar or a rectangular bar. A double rail track may also be used in lieu of a monorail structure.

Travelling along the monorail are work carriers, preferably in the form of perforated cylindrical plating barrels 18 of non-conductive materials, such as hard rubber, Lucite or melamine. The barrels are rotatably supported between the dependent arms of a yoke member 19. The conveyor may be used in conjunction with all types of cellular liquid treatment. For non-electrolytic treatments (phosphating) metal cylinders may be used in place of the non-metallic barrels.

Yoke 19 is suspended below a trolley 20 having two sets of wheels which ride on either side of the lower flange of the rail 17 to transport the barrel to selected stations. While a wheeled trolley is shown herein, this is only necessary for heavy duty operations. For example, slide type trolleys may be used on light duty work.

Each transfer rail segment 17 is movable downwardly by means of an individual elevator having vertical frame beams 21 and a continuous chain 22 to which the transfer segment is mechanically coupled, so that when the chain is driven by a suitable hydraulic mechanism, the segment may be lowered or raised thereby depending on the direction of drive. When the rail segment is lowered with a work carrier thereon, the plating barrel 18 is immersed in a processing tank 23 at the work station. Mounted adjacent the end wall of the tank is a drive motor 24 for rotating the barrel through a speed reducer 25 whose output gear intermeshes with a drive gear 26 projecting from one end of the yoke 19 and operatively coupled to the barrel gear 27. Also projecting from opposing ears on the yoke are two electrodes or horns 28 which when the barrel is lowered into the tank are seated in and electrically engage with contact saddles 29 to supply plating current in the usual manner.

The trolleys 20 of the several work carriers are indexed or shifted in a stepwise manner along the monorail in one direction by means of spaced pushed fingers or dogs 30 which are pivotally connected to a reciprocally operated actuator bar 31 disposed above the rail and parallel thereto. Attached to each trolley is a trolley bracket TB which is engaged by dog 30 to push the trolley.

The bar 31 is slidably supported between rollers and is driven by a hydraulic piston or other means to which it is coupled by means of suitable straps. The bar is driven in alternate directions and at timed intervals. The pusher dogs are not fixedly connected to the trolleys, hence the trolleys are free-running. In lieu of an actuator bar arrangement, power trolleys may be provided on a separate rail provided with pusher dogs to engage the carrier trolley, thereby to form a power and free conveyor system.

Resiliently supported above each transfer rail segment by means of helical springs 32 is a substitute rail segment 33 which is an exact duplicate of segment 17. The arrangement is such that when the transfer segment 17 is lowered, the substitute segment 33 is urged by the springs downwardly in place of the transfer segment so that no break exists in the continuity of the trackway and successive work carriers are able to proceed without interruption and skip over any work carrier which has been lowered into a work station. Thus the withdrawal of one or more work carriers from the trackway does not act to delay the transfer of other carriers. While the transfer segments are shown herein as spring-mounted, it is to be understood that any of the other arrangements disclosed in the copending application may be used for the mounting of the substitute segment and for insertion thereof upon removal of the main track segment.

For each forward stroke of the transfer bar, the pusher finger 30 advances a trolley 20 from one work station to the next. The trolley is halted by a pivotally mounted latching stop 34 when it occupies a center position on the rail segment 17 above the appropriate work station. Stop 34 is acted upon by a latching mechanism such that it centers the carrier during the transfer interval but it is withdrawn during the indexing operation to permit the advance of the carrier on the rail.

*The tripper mechanism*

Figure 3:
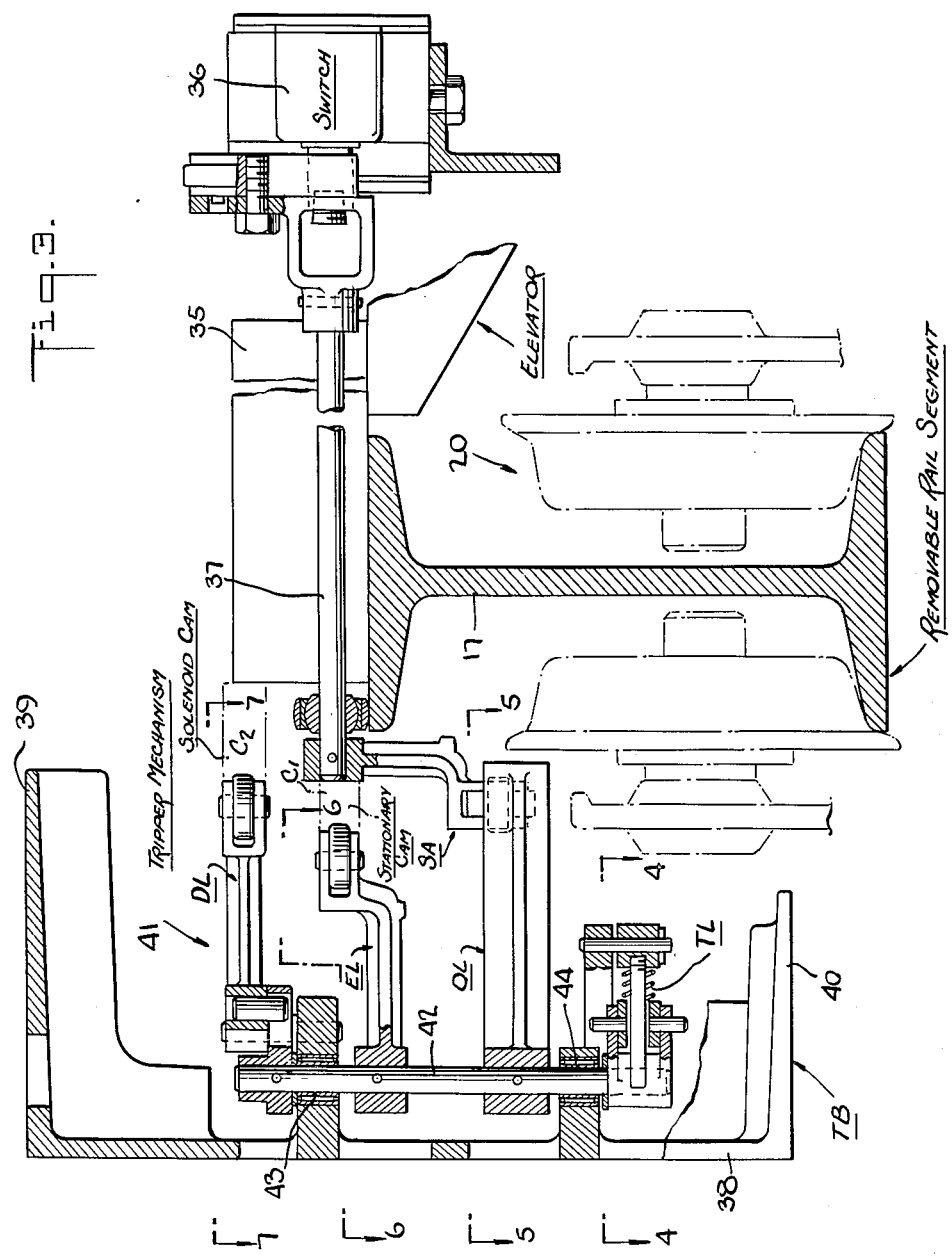
Fig. 3 is a vertical section taken through one carrier and an associated elevator station.

Referring now to Fig. 3, there is shown in vertical section one carrier trolley 20 riding on the lower flange of a removable rail segment 17. Segment 17 is secured to the frame 35 of an elevator for lowering and raising the work carrier with respect to a processing station. The operation of the elevator is initiated by an electric switch 36, such that when the switch is actuated, the elevator is lowered to the Down position where it remains for a predetermined interval, before it is automatically returned to its Up position. A more detailed description of the electric control system for the elevator may be found in my copending application Serial No. 670,780, filed July 9, 1957, entitled "Electric Hydraulic Control System for Leap Frog Conveyors." The present invention centers about the actuation of the elevator switch by the incoming carrier, since the operating cycle of the carrier is determined by whether or not the switches of the several stations are tripped in the course of the carrier travel through the conveyor system.

Switch 36 is controlled by an arm SA which is coupled thereto by means of a rod 37 supported for rotation above the upper flange of the track segment 17. The arm SA is attached to the free end of the rod and projects below the upper flange whereby when the arm is contacted by a operating element in the trigger mechanism borne by the work carier, it causes rotation of the rod to actuate the switch 36.

The pusher bracket TB attached to the trolley 20 and extending thereabove to be engaged by pusher dogs 30 (Fig. 2) for driving the trolley is constituted by a vertical mounting plate 38 and upper and lower walls 39 and 40 normal thereto to define an interior space for supporting a tripper mechanism, generally designated by numeral 41. The tripper, depending on its setting, is adapted either to engage the elevator switch arm SA and thereby cause the carrier to be lowered, or the arm is not engaged, in which case the elevator remains at the Up position.

The trigger mechanism is constituted by three signalling levers DL, EL and OL and a toggle lever TL linked to a common shaft 42 supported for rotation on bearings 43 and 44 mounted on mounting plate 38 of the pusher bracket, the shaft lying in spaced parallel relation to the plate.

Figure 4:
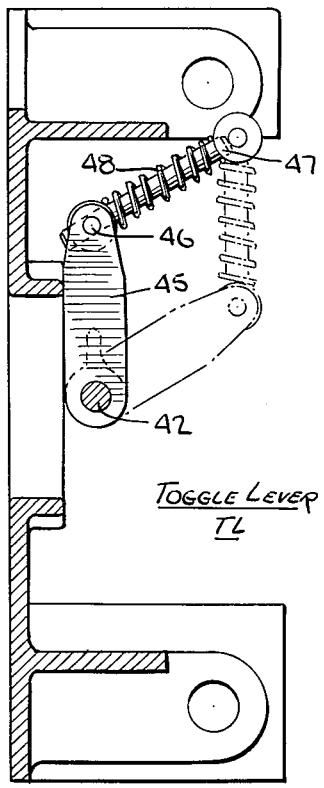
Fig. 4 is a sectional view taken along lines 4—4 in Fig. 3 showing the details of the toggle lever of the tripper mechanism.

Mounted at the lower end of the shaft below bearing 44 is the toggle lever TL, which, as best seen in Fig. 4, includes a finger 45 keyed directly to the shaft, the other end of the finger being pivotally secured by a pin 46 to a rod 47, the pin riding in a longitudinal slot in the rod. The rod 47 is pivotally mounted on the bracket, a helical spring 48 surrounding the rod to urge the finger elements toward the end thereof. Thus a toggle action is provided in which the shaft 42 is held in either one of two angular positions. A rotation of the shaft in the clockwise direction caused by engagement of the disengaging or engaging levers EL or DL with a cam causes the toggle lever TL to snap from the position shown in solid lines in Fig. 4, to the position shown in phantom.

Figure 5:
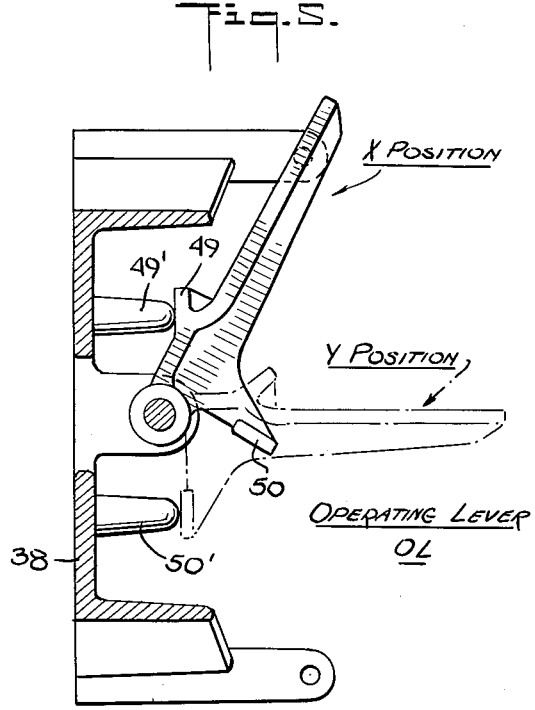
Fig. 5 is a sectional view taken along lines 5—5 in Fig. 3 showing the details of the operating lever of the tripper mechanism.

Also mounted on shaft 42 above the bearing 44 is the operating lever OL which, as best seen in Fig. 5, is provided at either side with stops 49 and 50 which strike abutments 49' and 50' on the bracket mounting plate 38 to limit the movement of the lever. Lever OL has two operative positions. In the out position X, which is the position shown, the lever is inoperative. In the In position Y, shown in phantom, the lever OL is out stretched and since it is at about the same elevation as the control arm SA for the elevator switch it will contact same when the carrier moves into the stations thereby initiating the operation of the elevator. But when the lever is retracted at the X position, the arm SA will not be engaged, the elevator will stay in the Up position and the station will be by-passed by the next transfer movement.

Figure 7:
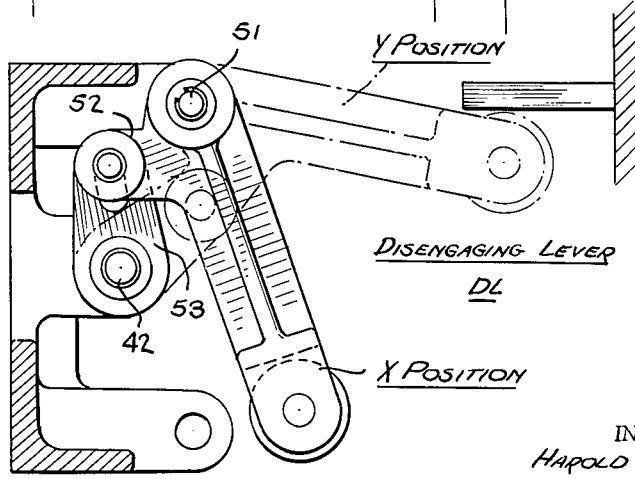
Fig. 7 is a sectional view taken along lines 7—7 in Fig. 3 showing the details of the disengaging lever of the tripper mechanism.

When the carrier leaves the station, a stationary cam $C_1$, mounted on a fixed part of the track between elevators will engage the disengaging lever DL shown separately in Fig. 7, if the lever is outstretched to asume its Y position, in which case the lever will be rotated in the clockwise rotation about a pivot point 51. An offset lug 52 is attached to lever DL, arm 52 being pivotally linked to an arm 53 keyed to shaft 42, such that rotation of lever DL in the clockwise direction causes rotation of the shaft in the counter-clockwise direction to snap to toggle lever and thereby hold the lever DL in its Out or X position. Thus the X position of lever DL is the retracted position therefor, whereas the X position is the outstretched position for the operating lever DL.

Before the carrier arrives at the next station it encounters a solenoid controlled cam $C_2$. As shown separately in Fig. 6, cam $C_2$ acts in conjunction with the engaging lever EL which is at about the same elevation. This lever, at position X, is outstretched to engage cam $C_2$ in which case it causes rotation of shaft 42 so as to snap the toggle and thereby place the engaging lever EL in its retracted or inoperative position Y. In this event the operating lever OL is outstretched and when the carrier enters the next station, the elevator switch is triggered. But if the solenoid cam $C_2$ is electromagnetically withdrawn, then the outstretched engaging lever EL will not be engaged, the operating lever OL will remain retracted and the next station will be by-passed.

*Review of tripper operation*

The sequential functioning of the tripper mechanism will now be summarized. Let us first assume that in entering a given station, the three signal levers are in their respective X positions, as a result of which:

Operating lever OL is retracted
Disengaging lever DL is retracted
Engaging lever EL is outstretched Thus the carrier entering the station will not trip the elevator switch arm SA and the station will be by-passed. Position X, therefore, is the by-passing position. In transferring to the next station, the cam $C_1$ will not be engaged by the retracted disengaging lever. Assuming however that the control cam $C_2$, which is encountered before the next station is entered, is extended, then the outstretched engaging lever EL will be engaged to switch over the trigger mechanism and cause the signal levers to assume their respective Y positions as a result of which:

Operating lever OL is outstretched
Disengaging lever DL is outstretched
Engaging lever EL is retracted Thus the carrier entering the next station will have its elevator switch actuated by the outstretched operating lever OL, and the carrier will be lowered for processing. Position Y therefore is the processing position. Thereafter when leaving this station, the outstretched disengaging lever DL will engage cam $C_1$ and switch over the tripper mechanism to position X for the signalling levers so that the carrier will by-pass the next station unless the control cam $C_2$ is electromagnetically extended, in which event the tripper will switch over to position Y. Thus for any positions of the trigger when approaching a station, this position may be reversed or maintained by control of cam $C_2$, thereby permitting a selective action for determining the cycle of operation. The operation of the solenoid cam may of course be controlled at a control panel.

Cycle selector

Figure 8:
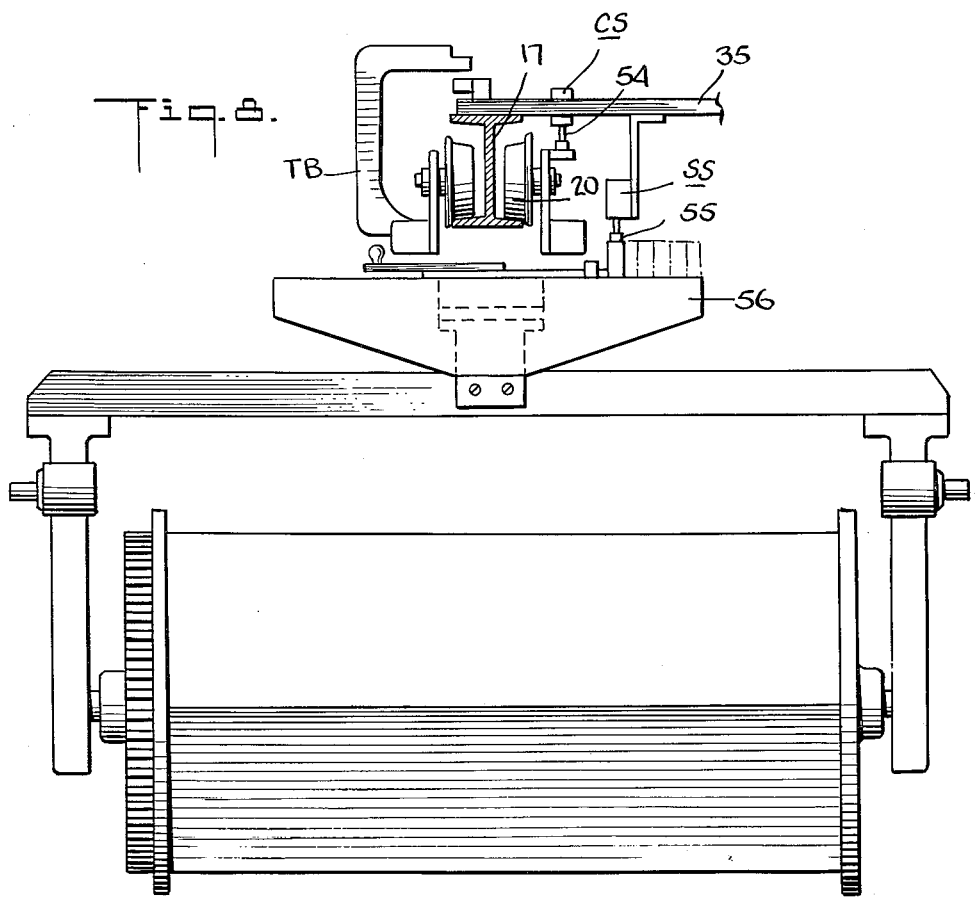
Fig. 8 shows in vertical section a cycle selector for individual carrier control.
Figure 9:
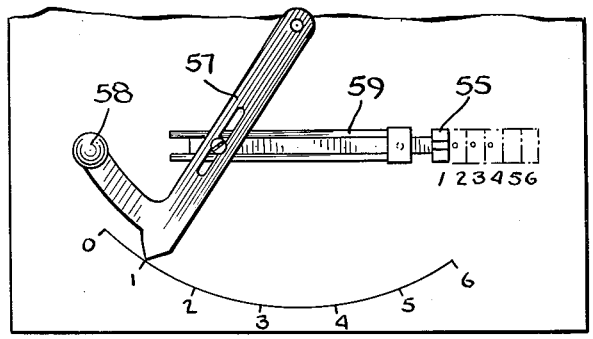
Fig. 9 is a plan view of the selector lever device.

Referring now to Figs. 8, 9 and 10, there is shown a cycle selector for individual carrier control. As best seen in Fig. 8, the wheels of the trolley carrier 20 ride on either side of the lower flange of the track segment 17 forming a removable section of the conveyor trackway. Segment 17 is carried by the frame 35 of the elevator and is movable therewith when the elevator switch is actuated.

The tripper mechanism bracket TB is mounted on one side of the carrier so that as the carrier travels along the trackway, the tripper mechanism rides in a path parallel thereto to engage the various control cams. Fixedly attached to the carrier 20 on the other side thereof and projecting upwardly is a flag element 54 adapted to engage and trigger a clearance switch CS. As best seen in Fig. 10, clearance switch CS is mounted on the upper flange of fixed track section 16 at a position between the removable segments 17.

The fixed cam $C_1$ which cooperates with the disengaging lever DL is in this embodiment mounted on the upper flange of the segment 17 at the outgoing side thereof to make contact with the disengagement lever DL when the carrier departs from the station. Thus, assuming that the tripper mechanism is at the Y position when it enters a given segment to cause actuation of elevator switch, upon departing from the same station, the cam $C_1$ will cause the tripper mechanism to revert to the X position. In transfer movement the trolley flag 54 will trip clearance switch CS which opens its contacts momentarily to break a mechanically-held relay MR circuit connected to the solenoid cam $C_2$ which is positioned on the fixed track 16. Unless solenoid cam $C_2$ is energized and thereby extended, the carrier will skip the next processing station or stations.

Also provided is a dog 55 mounted on the bumper 56 of the trolley, the dog being secured to a manually operated lever 57 provided with a selector handle 58. The action of the lever is controlled by a detent 59 such that the lever may selectively be moved into any one of six positions, thereby correspondingly positioning the dog in any one of six settings 1 to 6, equi-distant from each other in a direction perpendicular to the line of motion of the carrier (note Fig. 9).

A cycle selector switch SS is set at a position between track segments so as to engage the dog 55 for the designated cycle allotted for that position. For example, the cycle selector switch SS may in one instance be placed to engage the dog 55 at its setting 3, in another case it may be placed to intercept the dog at position 6, etc. The switch SS, when actuated, will energize the control circuit MR for the solenoid cam $C_2$, whereby the cam is extended into the path of the engaging lever EL, thus switching over the operating lever EL into its Y position, whereby the carrier entering the next station will trip the elevator switch arm SA.

For a cell processing sequence all that need be done is to provide a fixed cam $C_1$ on the elevator track segment 17 of each station at the outgoing side thereof. Hence cam $C_1$ will act to contact the disengaging lever DL to switch over the tripper mechanism to its X positions and the carrier will skip all succeeding stations until it reaches an extended solenoid cam $C_2$ which will then switch over the tripper mechanism to its Y positions thereby causing the operating lever EL to trip the next elevator switch. From the foregoing it becomes evident that it is possible to arrange any cycle and to set up with fixed and solenoid cams the desired cycles, operator selected for each carrier.

Review of cycle selector operation

The sequential functioning of the cycle selector will now be summarized. Let us first assume that in entering a given station, the three signal levers of the tripper mechanism are in their respective Y positions, in which event the following is the lever status:

Operating lever OL is outstretched
Disengaging lever DL is outstretched
Engaging lever EL is retracted In this condition the carrier which enters the station will trip the elevator switch and processing will take place. In transferring to the next station, the tripper mechanism encounters the fixed cam $C_1$ on the outgoing side of the track segment, causing the tripper mechanism to switch over to the X positions in which case:

Operating lever OL is retracted.
Disengaging lever DL is retracted.
Engaging lever EL is outstretched.

As the carrier moves between stations, the flag 54 trips clearing switch CS, thereby deactivating the circuit MR for the solenoid cam $C_2$, in which event the cam is withdrawn. In the event the setting of the dog 55 is not such as to trip the selector switch SS, then the cam $C_2$ remains retracted, the carrier enters the next station with the tripper mechanism in the X positions and the station is skipped. But if the dog is set to trip selector switch SS, then cam $C_2$ is extended and the engaging lever EL meets the cam to switch over the tripper to the Y positions and processing automatically takes place at the next station. In short, processing cannot take place at any given station unless selector dog is set so as to coact with the selector switch SS which is positioned in advance of the station.

It will be understood that while manual control means is shown for adjusting the selector dog, this operation may be carried out automatically by remote control means such as a carrier frequency radio signalling system.

While I have shown what are considered to be preferred embodiments of the invention, it will be manifest that many changes and modifications may be made therein without departing from the essential spirit of the invention. It is intended, therefore, in the annexed claims to cover all such changes and modifications as fall within the scope of the invention.

What is claimed is:

1. In a conveyor system provided with a plurality of work carriers, a track for conveying said carriers to various work stations disposed below said track and including removable rail segments vertically disposed above said stations, separate elevators operatively coupled to each of said segments to lower same to a respective work station therebelow, switch means for operating each elevator and provided with an actuating arm disposed at the associated segment, a tripper mechanism borne by said carrier and including a retractable operating lever adapted to engage said arm when said carrier enters a segment above a station and means including a control cam positioned on said track in advance of each segment therein in the line of carrier movement adapted to control the position of said operating lever whereby either the operating lever is extended to effect said engagement whereby said elevator is caused to lower said segment or said operating lever is retracted and said elevator is by-passed.

2. In a conveyor system provided with a plurality of work carriers, a track for conveying said carriers to various work stations disposed below said track, said track including removable rail segments vertically disposed above said stations, separate elevators operatively coupled to each of said segments to lower same to a respective work station therebelow, substitute rail segments normally disposed above said removable segments and adapted to replace said removable segments when lowered by the respective elevators associated therewith, a switch for operating each elevator provided with an actuating arm disposed at the associated segment, a tripper mechanism borne by said carrier and including a retractable operating lever adapted selectively to engage said arm when said carrier enters a segment above a station and means including a control cam positioned on said track in advance of each segment therein in the line of carrier movement adapted to control the position of said operating lever whereby either the operating lever is operative to effect said engagement whereby said elevator is caused to lower said segment or said operating lever is retracted and said elevator is by-passed.

3. In a conveyor system provided with a plurality of work carriers, a track for conveying said carriers to various work stations disposed below said track and including removable rail segments vertically disposed above said stations, separate elevators operatively coupled to each of said segments to lower same to a respective work station therebelow, switching means for operating each elevator, a tripper mechanism borne by said carrier and including signal means to trip said switching means when said carrier enters a station segment above a station and means including a control cam positioned on said track in advance of each segment therein in the line of carrier movement selectively to control said signal means whereby said carrier either actuates said switching means and is thereby lowered for processing or said carrier skips said station.

4. A conveyor system comprising a plurality of work carriers, an overhead track for conveying said carriers to various work stations disposed below said track and including removable rail segments vertically disposed above said stations, separate elevators operatively coupled to each of said segments to lower same to a respective work station therebelow, a switch for operating each elevator provided with an actuator arm disposed at the associated segment, a fixed cam mounted on said track at a point thereon between said removable rail segments, a retractable control cam positioned in advance of each segment in the line of carrier movement, a tripper mechanism for individual carrier selection of a predetermined operating cycle, said tripper mechanism being borne by each carrier and including an operating lever adapted to engage said arm when said carrier enters a segment above a station, a disengaging lever adapted to engage said fixed cam and an engaging lever adapted to contact said control cam, said tripper mechanism having two operative positions X and Y, wherein in position X the operating lever is retracted, the disengaging lever is retracted and the engaging lever is extended and in position Y said operating lever is extended, said disengaging lever is extended and said engaging lever is retracted, said fixed cam when contacted by the extended disengaging lever causing said tripper mechanism to assume position X, said control cam when extended being contacted by said engaging lever, when extended to cause said tripper mechanism to assume position Y.

5. A conveyor, as set forth in claim 4, wherein said tripper mechanism further includes a toggle to maintain said mechanism in either of the selected positions.

6. A controlled conveyor system comprising a plurality of work carriers, an overhead track for conveying said carriers to various work stations disposed below said track, said track including removable rail segments, vertically disposed above said stations, separate elevators operatively coupled to each of said segments to lower same to a respective work station therebelow, substitute rail segments normally disposed above said removable segments and adapted to replace said removable segments when lowered by the respective elevators associated therewith, means to transfer said carriers on said track from removable segment to removable segment, a switch for operating each elevator provided with an actuator arm disposed at the associated removable segment, a fixed cam mounted on said track at a point thereon encountered by a carrier going out of a removable segment, a retractable control cam positioned in advance of each removable segment in the line of carrier movement, a tripper mechanism for individual carrier selection of a predetermined operating cycle, said tripper mechanism being borne by each carrier and including an operating lever adapted to engage said switch arm when said carrier enters a segment above a station, a disengaging lever adapted to engage said fixed cam when said carrier is transferred between stations and an engaging lever adapted to contact said control cam before said carrier enters the next station, said tripper mechanism having two operative positions X and Y, wherein in position X the operating lever is retracted, the disengaging lever is retracted and the engaging lever is extended and in position Y said operating lever is extended, said disengaging lever is extended and said engaging lever is retracted, said fixed cam when contacted by the extended disengaging lever causing said tripper mechanism to assume position X, said control cam when extended being contacted by said engaging lever, when extended to cause said tripper mechanism to assume position Y.

7. A system, as set forth in claim 6 further including individual carrier selection means operating in conjunction with said control cam selectively to extend or retract said cam during said transfer from station to station.

8. A system, as set forth in claim 7, wherein said individual carrier selection means including a dog borne by said carrier and selectively positionable thereon to any one of a plurality of settings, and a switching device so mounted in said track between stations to engage said dog when said dog occupies a given setting, and means controlled by said device to extend said control cam when said device is engaged by said dog.

References Cited in the file of this patent

UNITED STATES PATENTS

| | | |
|---|---|---|
| 2,273,583 | Meister | Feb. 17, 1942 |
| 2,671,861 | Bullard | Mar. 9, 1954 |
| 2,685,863 | Martin | Aug. 10, 1954 |
| 2,688,934 | Quail | Sept. 14, 1954 |
| 2,751,091 | Freeman | June 19, 1956 |
| 2,789,569 | Davis | Apr. 23, 1957 |
| 2,854,159 | Abbey | Sept. 30, 1958 |
| 2,885,055 | Hauck | May 5, 1959 |